United States Patent [19]
Aoki

[11] Patent Number: 5,523,885
[45] Date of Patent: Jun. 4, 1996

[54] VIEWFINDER OPTICAL SYSTEM

[75] Inventor: Norihiko Aoki, Tokyo-to, Japan

[73] Assignee: Olympus Optical Co., Ltd., Tokyo-to, Japan

[21] Appl. No.: 603,542

[22] Filed: Oct. 26, 1990

[30] Foreign Application Priority Data

Oct. 27, 1989 [JP] Japan .................. 1-278583

[51] Int. Cl.$^6$ .................. G02B 3/02; G02B 9/06
[52] U.S. Cl. .................. 359/654; 359/434; 359/652
[58] Field of Search .................. 350/413; 359/652–654, 359/642–648, 689–692, 676, 683, 362, 363, 432–435; 354/224, 225; 358/98, 211, 255

[56] References Cited

U.S. PATENT DOCUMENTS

| | | | |
|---|---|---|---|
| 3,722,979 | 3/1973 | Mikami | 359/423 |
| 4,249,798 | 2/1981 | Moskovich | 359/683 |
| 4,387,967 | 6/1983 | Yamazaki et al. | 359/687 |
| 4,515,444 | 5/1985 | Prescott et al. | 359/654 |
| 4,618,234 | 10/1986 | Ikari et al. | 359/434 |
| 4,730,905 | 3/1988 | Takada | 359/652 |
| 4,735,491 | 4/1988 | Takahashi | 359/652 |
| 4,859,040 | 8/1989 | Kitagishi et al. | 359/652 |
| 4,953,957 | 9/1990 | Kobayashi | 359/652 |
| 4,964,703 | 10/1990 | Suda et al. | 359/652 |
| 4,988,172 | 1/1991 | Kanamori et al. | 350/413 |
| 4,998,807 | 3/1991 | Uzawa et al. | 359/654 |
| 5,011,272 | 4/1991 | Nakayama et al. | 350/413 |
| 5,182,672 | 1/1993 | Mukai et al. | 359/654 |

FOREIGN PATENT DOCUMENTS

| | | | |
|---|---|---|---|
| 60-233628 | 11/1985 | Japan . | |
| 61-29816 | 2/1986 | Japan . | |
| 1222214 | 9/1989 | Japan . | |
| 285312 | 11/1990 | Japan | 359/652 |

OTHER PUBLICATIONS

"Aberrtions and Design of Graded–Index (GRIN) Rods Used as Image Relays", Paxton et al, Applied Optics, vol. 10, No. 9, Sep. 1971 pp. 2090–2096.

*Primary Examiner*—Thong Q. Nguyen
*Attorney, Agent, or Firm*—Cushman, Darby & Cushman

[57] ABSTRACT

An optical system comprising, in the order from the object side, an objective lens unit having a positive refractive power, a relay lens unit having a positive refractive power and an eyepiece lens unit having a positive refractive power, adapted in such a manner that an inverted image formed by the objective lens unit is inverted once again by the relay lens unit for forming an erect image, using at least one graded refractive index lens element in the relay lens unit, and having a small number of lens elements or a high magnification and favorably corrected aberrations.

12 Claims, 7 Drawing Sheets

VIEWFINDER OPTICAL SYSTEM

BACKGROUND OF THE INVENTION a) Field of the Invention

Figure 1:
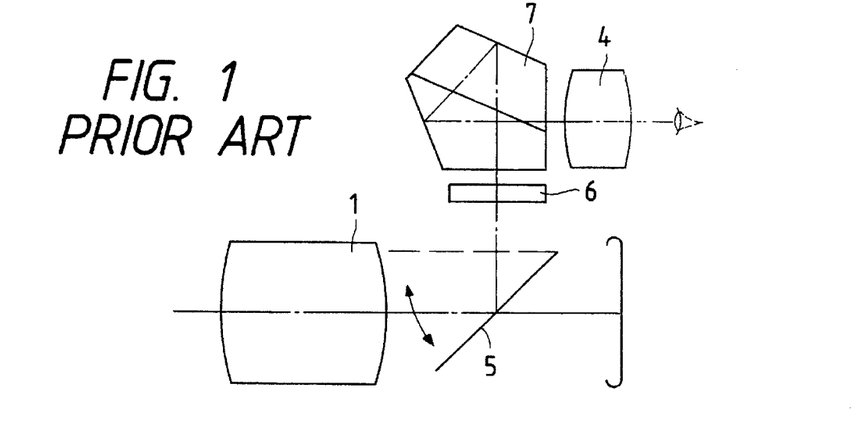
FIG. 1 shows a sectional view illustrating the composition of the conventional viewfinder optical system.

The present invention relates to an observation optical system which permits observing, through an eyepiece lens, an image of object which is formed by inverting, with a relay lens, an inverted image formed by an objective lens.

b) Description of the Prior Art:

In the conventional viewfinder optical system for single-lens reflex cameras illustrated in FIG. 1, a light bundle having passed through a photographic lens is split by a quick return mirror 5 into two light bundles to be used in a photographic system and a viewfinder system respectively. The light bundle to be used by the viewfinder system forms an inverted image on a screen mat 6, which is inverted to form an erect image by a pentagonal prism 7 for observation through an eyepiece lens 4.

On the other hand, electronic still cameras and video cameras use, as image pickup elements, ⅔ inch and ½ inch CCD image sensors and so on which are too small for cameras designed for use with a 35 mm film. Accordingly, the eyepiece lens systems which are similar to those used in the conventional cameras for the 35 mm film do not permit observing images of sufficiently large sizes. For this reason, it is necessary for electronic still cameras and video cameras to enhance magnification levels of the eyepiece lens systems by shortening the focal lengths thereof. When the focal lengths of the eyepiece lens systems are shortened for enhancing the magnification levels thereof, however, the distances as measured from the eyepiece lens systems to the surfaces of images to be observed are shortened. In order to arrange erection prisms, etc., it is necessary to select a compositions of the eyepiece lens systems in which the principal points of the eyepiece lens systems are shifted toward the surfaces to be observed. That is to say, the eyepiece lens systems must have, when they a reconsidered as photographic lens systems, long back focal lengths.

As the conventional examples of viewfinder optical systems to be used with the single-lens reflex type electronic still cameras and video cameras, there are known the optical systems disclosed by Japanese Patent Kokai Publication No. Sho 61-29816 and Japanese Patent Kokai Publication No. Sho 60-233628.

The former example uses a roof prism, as the erect prism, in combination with an eyepiece lens system composed of five or six lens elements. The latter example uses a trigonal prism, as the erect prism, in combination with an eyepiece lens system composed of three or four lens elements.

These conventional examples require high manufacturing costs since the eyepiece lens systems thereof are composed of large numbers of lens elements as described above and the roof prism must be polished with high precision when the eyepiece lens system is to have a high magnification level.

Further, as a method to convert an inverted image into an erect image, there is known the method disclosed by Japanese Patent Kokai Publication No. Hei 1-222214. This method uses, in place of the roof prism, a relay lens system which inverts and refocuses an image formed by a photographic lens system. The patent also discloses a viewfinder optical system which permits observing the image inverted by the relay lens system through an eyepiece lens system. The relay lens system and the eyepiece lens system are composed of six lens elements, and the viewfinder optical system has a distance of approximately 120 mm as measured from the eyepoint to the image surface thereof and a magnification of ×13.5.

In the conventional example described above or a viewfinder optical system which is generally referred to as the real image type, both the relay lens system and the eyepiece lens system have positive refractive powers, and Petzvals's sum of the viewfinder optical system has a large positive value which causes degradation in image quality. Especially when the viewfinder optical system comprises a larger number of lens elements or has an enhanced magnification, the Petzval's sum is further aggravated and cannot be corrected.

SUMMARY OF THE INVENTION

Primary objects of the present invention are to provide a viewfinder optical system which uses a relay lens unit for erecting an image, is suited for use with single-lens reflex type electronic still cameras and video cameras, and has aberrations favorably corrected regardless of a small number of lens elements composing the optical system.

Other objects of the present invention are to provide a viewfinder optical system which uses a relay lens unit for erecting an image, is suited for use with single-lens reflex type electronic still cameras and video cameras, and has aberrations corrected favorably regardless of a very high magnification imparted thereto.

The viewfinder optical system according to the present invention is characterized in that it comprises, in the order from the object side, at least an objective lens unit, a relay lens unit having a positive refractive power and an eyepiece lens unit having a positive refractive power, that an inverted image of an object to be observed formed by the objective lens unit is inverted once again by the relay lens unit so as to be focused as an erect image for observation through the eyepiece lens unit, and that relay lens unit or the eyepiece lens unit comprises at least one lens element designed as a graded refractive index lens element.

Figure 2:
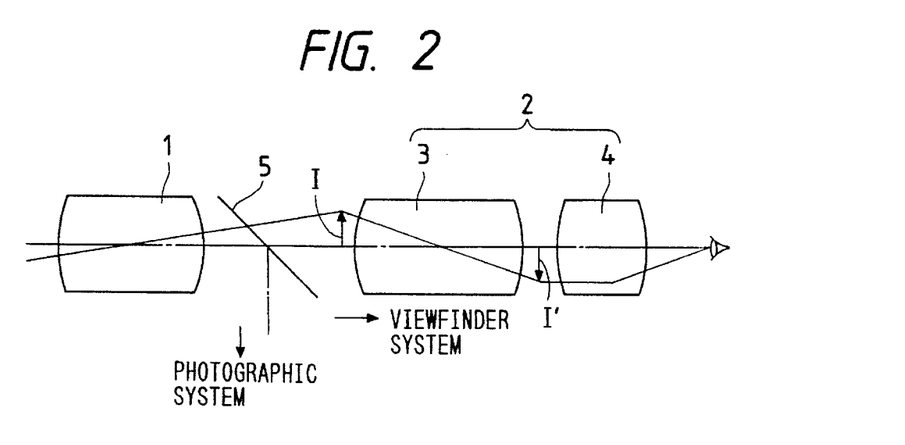
FIG. 2 shows a schematic sectional view illustrating the fundamental composition of the viewfinder optical system according to the present invention.

A fundamental composition of the viewfinder optical system is illustrated in FIG. 2, wherein the reference numeral 1 represents a photographic lens (the objective lens unit), the reference numeral 2 designates an observation optical system composed of a relay lens unit 3 and an eyepiece lens unit 4, and the reference numeral 5 denotes a splitting mirror for splitting an optical path into an observation optical path and a photographic optical path. In this optical system, the light bundle having passed through the objective lens unit 1 is split by the splitting mirror 5 into a photographic light bundle and an observation light bundle, and an image I formed on the observation side is inverted by the relay lens unit 3 so as to be refocused as an erect image I'. This erect image I' is to be observed through the eyepiece lens unit 4.

Further, the viewfinder optical system according to the present invention is designed so as to correct Petzval's sum thereof by adopting at least one graded refractive index lens element in the relay lens unit or the eyepiece lens unit comprised in the viewfinder optical system.

The graded refractive index lens element used in the viewfinder optical system according to the present invention is of the so-called radial type graded refractive index lens element having refractive index varied in the direction perpendicular to the optical axis, and the refractive index distribution of the lens element is expressed by the following formula:

$$N(h)=N_0+N_1h^2+N_2h^4+N_3h^6+\ldots$$

wherein the reference symbol $N_0$ represents the refractive index of said lens element as measured on the optical axis, the reference symbol h designates the distance from the optical axis to the lens portion of interest as measured in the radial direction, the reference symbol $N(h)$ denotes the refractive index of the lens portion located at the distance of h from the optical axis, and the reference symbols $N_1$, $N_2$, $N_3$, . . . represent the refractive index distribution coefficients of the second order, fourth order, sixth order, . . . respectively.

The radial type graded refractive index lens element (radial GRIN lens element) has a refractive power of medium thereof and a Petzval's sum expressed by the following formula (i):

$$PS=\phi_S/N_0+\phi_M/N_1^2 \qquad (i)$$

wherein the reference symbol PS represents the Petzval's sum of the radial GRIN lens element, the reference symbol $\phi_M$ designates the refractive power of medium of the radial GRIN lens element and the reference symbol $\phi_S$ denotes the refractive power of surface of the radial GRIN lens element.

The refractive power of medium means the refractive power of the radial GRIN lens element when it has planar surfaces of incidence and emergence, and the refractive power of surface means the refractive power of a homogenous lens element which has the same shape as that of the radial GRIN lens element and has the same refractive power as that of the radial GRIN lens element as measured on the optical axis.

As is understood from the above-mentioned formula, the radial GRIN lens element can have a Petzval's sum which is smaller than that of the homogenous lens element having the same refractive power when the refractive power of medium and the refractive power of surface of the radial GRIN lens element have the same sign. Further, the radial GRIN lens element can have a Petzval's sum of a sign reverse to that of the homogenous lens element when the refractive power of medium and the refractive power of surface have signs which are reverse to each other. Accordingly, it is possible to obtain a sufficiently small Petzval's sum of the viewfinder optical system by using the radial GRIN lens element. The use of the radial GRIN lens element having the capability to correct Petzval's sum makes it possible to enhance magnification.

First, description will be made on how the number of lens elements is reduced and aberrations are corrected in the viewfinder optical system according to the present invention by using the radial GRIN lens element.

In the real image type viewfinder optical system which comprises a relay lens unit and is called real image type, it is generally necessary to compose the relay lens unit of at least one negative lens element and four or more positive lens elements for correcting Petzval's sum, chromatic aberration and spherical aberration.

Since the radial GRIN lens element refracts light also by the medium thereof, the lens element can correct aberrations when an adequate refractive index distribution is selected for the lens element. Further, the radial GRIN lens element can correct chromatic aberration when it is designed so as to have refractive index gradients which are different at different wavelengths. That is, the use of the radial GRIN lens element enhances flexibility for correction of aberrations and permits remarkably reducing the number of lens elements composing the relay lens unit.

When at least one radial GRIN lens element is to be used in the relay lens unit of the viewfinder optical system according to the present invention, it is desirable to design the radial GRIN lens element so as to satisfy the following condition (1):

$$-5.0<N_{1(R)}\cdot f^2<0 \qquad (1)$$

wherein the reference symbol $N_{1(R)}$ represents the value of the refractive index distribution coefficient of the second order, for the d-line, of the radial GRIN lens element to be used in the relay lens unit and the reference symbol f designates the total focal length of the relay lens unit and the eyepiece lens unit.

If the lower limit of the condition (1) is exceeded, the medium of the radial GRIN lens element will undesirably produce remarkable negative spherical aberration and distortion. If the upper limit of the condition (1) is exceeded, the medium of the radial GRIN lens element will have a negative refractive power and the refractive powers of the positive lens elements arranged in the relay lens unit must be strengthened for obtaining the positive refractive power required for the relay lens unit, thereby resulting in undercorrection especially of the spherical aberration.

The Petzval's sum of the relay lens unit can be remarkably reduced by sharing most of the refractive power of the relay lens unit to the medium of the radial GRIN lens element satisfying the above-mentioned condition (1) and the lessening of the burden imposed on the relay lens unit a correct the Petzval's sum allows to reduction in the number of lens elements composing the relay lens unit.

It can be conceived, for reducing a Petzval's sum of the lens unit having the positive refractive power, to strengthen the refractive powers of the positive lens elements and/or produce a negative Petzval's sum by using the negative lens element. When the strengthening of the positive refractive powers is combined with the production of the negative Petzval's sum as is generally practiced, it is inevitable to increase the number of the lens elements composing the lens unit having the positive refractive power. This applies also to correction of the chromatic aberration. Accordingly, it is impossible to compose the lens unit having the positive refractive power of lens elements of a number smaller than a certain limit when the lens unit is composed only of homogenous lens elements.

The radial GRIN lens element can correct not only the Petzval's sum but also the chromatic aberration. In order to correct longitudinal chromatic aberration with the radial GRIN lens element, it is necessary to design the radial GRIN lens element so as to satisfy the following formula (ii):

$$\phi_S/v_{0d}+\phi_M/v_{1d}=0 \qquad (ii)$$

wherein the reference symbol $v_{0d}$ represents the Abbe's number determined from the refractive index $N_0$ of the radial GRIN lens-element as measured on the optical axis, and the reference symbol $v_{1d}$ designates the value calculated from the refractive index distribution coefficients $N_{1d}$, $N_{1C}$ and $N_{1F}$ of the second order for the d-line, C-line and F-line respectively by the following formula:

$$v_{1d}=N_{1d}/(N_{1F}-N_{1C})$$

As is clear from the above-mentioned formula (ii), it is possible to correct the chromatic aberration with a single radial GRIN lens element by adequately selecting the refractive power of surface and the refractive power of medium for the radial GRIN lens element.

As is understood from the formulae (i) and (ii), it is possible to correct the Petzval's sum and the longitudinal chromatic aberration at the same time with a single radial GRIN lens element by adequately selecting the refractive power of surface and the refractive power of medium for the radial GRIN lens element. Accordingly, the use of the radial GRIN lens element makes it possible to omit the negative lens element which is inevitably required for correcting the Petzval's sum and the chromatic aberration in a relay lens unit composed only of homogenous lens elements, thereby permitting reducing the number of the lens elements composing the relay lens unit.

When the radial GRIN lens element is used in the relay lens unit of the viewfinder optical system according to the present invention, the negative lens element is omitted or the number of the lens elements is reduced, while maintaining the favorably corrected aberrations, by designing the radial GRIN lens element so as to have a negative refractive power of surface and a positive refractive power of medium.

For the reason described above, it is desirable, when the relay lens unit is to be composed only of positive lens elements, to design the radial GRIN lens element to be used in the relay lens unit so as to satisfy the following condition (2):

$$\phi_{S(R)}/\phi_{M(R)}<0 \qquad (2)$$

wherein the reference symbols $\phi_{S(R)}$ and $\phi_{M(R)}$ represent the refractive power of surface and the refractive power of medium of the radial GRIN lens element to be used in the relay lens unit.

In addition, the positive radial GRIN lens element means a radial GRIN lens element which has a positive refractive power as a total of the refractive power of surface and the refractive power of medium thereof.

Condition (2) defines that the refractive power of surface of the radial GRIN lens element must have a sign different from that of the refractive power of medium thereof. If the upper limit of the condition (2) is exceeded, the refractive power of surface and the refractive power of medium will have the same sign, thereby making it impossible to correct the Petzval's sum.

When the relay lens unit comprises at least one radial GRIN lens element satisfying the condition (2), it is possible to obtain a viewfinder optical system which is composed of a small number of lens elements and have sufficiently corrected aberrations.

Further, it is possible to obtain a viewfinder optical system having more favorably corrected aberrations by using two radial GRIN lens elements each of which satisfies the condition (2), and has a negative refractive power of surface, a positive refractive power of surface and a positive total refractive power, and arranging these radial GRIN lens elements so as to oppose concave surfaces having small radii of curvature to each other in the relay lens unit.

Furthermore, it is possible to shorten the total length of the viewfinder while maintaining the favorably corrected aberrations by designing each of the two radial GRIN lens elements so as to satisfy the following condition (3):

$$-3.0<Y_R/Y_F<0.2 \qquad (3)$$

wherein the reference symbol $Y_R$ represents the height of the principal ray having the maximum field angle on the image side surface of the radial GRIN lens element whichever is arranged on the image side out of the two lens elements, and the reference symbol $Y_F$ designates the height of the principal ray having the maximum field angle on the object side surface of the radial GRIN lens element whichever is arranged on the object side.

If the lower limit of the condition (3) is exceeded, the angle formed between the offaxial ray and the optical axis will be widened, thereby making it impossible to correct the offaxial aberrations, and the effective diameter of the radial GRIN lens element arranged on the image side will be enlarged, thereby making it impossible to design the viewfinder optical system so as to be compact. If the upper limit of the condition (3) is exceeded, the total length of the relay lens unit will be prolonged for inverting the inverted image formed by the objective lens unit, thereby inevitably increasing the total length of the viewfinder optical system.

In order to enhance the magnification of the viewfinder optical system according to the present invention, it is necessary to shorten the focal length of the viewfinder optical system, but the shortening of the focal length aggravates the offaxial aberrations. In order to correct the offaxial aberrations, it is effective to design, as a radial GRIN lens element, a lens element on which the offaxial ray is incident at a large angle in the eyepiece lens unit or another lens element which is arranged in the relay lens unit and located near the eyepiece lens unit. This radial GRIN lens element is effective especially for correcting astigmatism and coma.

Enhancement of magnification of the viewfinder optical system according to the present invention permits observing a larger image of an object but narrows the range of aberrations allowable for the human eye, thereby making it necessary to correct the aberrations more strictly. Though use of an aspherical surface is conceivable for correcting the aberrations, an aspherical surface is ineffective for correcting Petzval's sum. It is therefor effective to use a radial GRIN lens element.

In order to correct the aberrations in the viewfinder optical system according to the present invention when its magnification is enhanced, the relay lens unit is designed so as to satisfy the following condition (4).

$$0.4<|\beta_R|<0.8 \qquad (4)$$

wherein the reference symbol $\beta_R$ represents the imaging magnification of the relay lens unit.

If the absolute value of the imaging magnification $\beta_R$ is smaller than the lower limit of condition (4), the angle formed between the offaxial ray passing through the relay lens unit and the optical axis will become larger, thereby making it impossible to correct the offaxial aberrations. Further, the relay lens unit will have a larger effective diameter on the side of the eyepiece lens unit, thereby making it impossible to design the viewfinder optical system so as to have a compact size. If the upper limit of condition (4) is exceeded, the axial ray will be enhanced, thereby undesirably resulting in undercorrection of spherical aberration.

The above-mentioned eyepiece lens unit or a radial GRIN lens element located in the vicinity thereof may be designed so as to satisfy conditions (1) through (3).

DETAILED DESCRIPTION OF THE PREFERRED EMBODIMENTS

Now, the present invention will be described in more detail below with reference to the preferred embodiments shown in the accompanying drawings and given in the form of the following numerical data:

Embodiment 1

$f = -18.5$, magnification $= 250/|f| = 13.5$ eye point: $-15$ from 1st surface diameter of pupil: 4 image surface: 5.9 from final lens surface

| | | | |
|---|---|---|---|
| $r_1 =$ | 22.1320 | | |
| | $d_1 = 2.5439$ | $n_1 = 1.51633$ | $v_1 = 64.15$ |
| $r_2 =$ | $-58.8234$ | | |
| | $d_2 = 36.6000$ | | |
| $r_3 =$ | 32.5230 | | |
| | $d_3 = 2.7031$ | $n_2 = 1.77250$ | $v_2 = 49.66$ |
| $r_4 =$ | $-40.2897$ | | |
| | $d_4 = 19.5692$ | | |
| $r_5 =$ | 8.6950 | | |
| | $d_5 = 2.4836$ | $n_3 = 1.60311$ | $v_3 = 60.70$ |
| $r_6 =$ | $-112.7537$ | | |
| | $d_6 = 4.6964$ | | |
| $r_7 =$ | $-7.6862$ | | |
| | $d_7 = 3.6767$ | $n_4 = 1.80518$ | $v_4 = 25.43$ |
| $r_8 =$ | 34.7539 | | |
| | $d_8 = 1.1600$ | | |
| $r_9 =$ | 28.0047 | | |
| | $d_9 = 24.2721$ GRIN lens | | |
| $r_{10} =$ | $\infty$ | | |

| | GRIN lens | | |
|---|---|---|---|
| | $N_0$ | $N_1$ | $N_2$ |
| d line | 1.69680 | $-0.28094 \times 10^{-2}$ | $0.45031 \times 10^{-5}$ |
| C line | 1.69297 | $-0.28026 \times 10^{-2}$ | $0.45800 \times 10^{-5}$ |
| F line | 1.70552 | $-0.28252 \times 10^{-2}$ | $0.43237 \times 10^{-5}$ |

$N_{1(R)} \cdot f^2 = -0.962$, $|\beta_R| = 0.598$
$D/|f| = 1.312$

The Abbe's number $v_{0d}$ has the value 55.42 for this embodiment.

Embodiment 2

$f = -18.5$, magnification $= 250/|f| = 13.5$ eye point: $-15$ from 1st surface diameter of pupil: 4 image surface: 1.4 from final lens surface

| | | | |
|---|---|---|---|
| $r_1 =$ | 38.8923 | | |
| | $d_1 = 2.5004$ | $n_1 = 1.51633$ | $v_1 = 64.15$ |
| $r_2 =$ | $-29.5956$ | | |
| | $d_2 = 36.6000$ | | |
| $r_3 =$ | 27.2720 | | |
| | $d_3 = 3.6148$ | $n_2 = 1.77250$ | $v_2 = 49.66$ |
| $r_4 =$ | $-17863.2531$ | | |
| | $d_4 = 24.4753$ | | |
| $r_5 =$ | 76.2891 | | |
| | $d_5 = 7.2469$ GRIN lens 1 | | |
| $r_6 =$ | 21.3266 | | |
| | $d_6 = 3.6470$ | | |
| $r_7 =$ | $-9.0426$ | | |
| | $d_7 = 8.8167$ GRIN lens 2 | | |
| $r_8 =$ | $-20.6785$ | | |
| | $d_8 = 16.4286$ | | |
| $r_9 =$ | 13.0000 | | |
| | $d_9 = 2.3998$ | $n_5 = 1.60311$ | $v_5 = 60.70$ |
| $r_{10} =$ | $\infty$ | | |

| | GRIN lens 1 | | |
|---|---|---|---|
| | $N_0$ | $N_1$ | $N_2$ |
| d line | 1.77250 | $-0.41887 \times 10^{-2}$ | $0.12959 \times 10^{-4}$ |
| C line | 1.76780 | $-0.41670 \times 10^{-2}$ | $0.13348 \times 10^{-4}$ |
| F line | 1.78336 | $-0.42394 \times 10^{-2}$ | $0.12052 \times 10^{-4}$ |

| | GRIN lens 2 | | |
|---|---|---|---|
| | $N_0$ | $N_1$ | $N_2$ |
| d line | 1.77250 | $-0.47863 \times 10^{-2}$ | $0.79548 \times 10^{-1}$ |
| C line | 1.76780 | $-0.47891 \times 10^{-2}$ | $0.77340 \times 10^{-5}$ |
| F line | 1.78336 | $-0.47798 \times 10^{-2}$ | $0.84701 \times 10^{-5}$ |

$N_{1(R)} \cdot f^2 = -1.434$ (GRIN lens 1)
$\phantom{N_{1(R)} \cdot f^2 =} -1.638$ (GRIN lens 2)
$\phi_{S(R)}/\phi_{M(R)} = -0.431$ (GRIN lens 1)
$\phantom{\phi_{S(R)}/\phi_{M(R)} =} -0.405$ (GRIN lens 2)
$|\beta_R| = 0.563$
$D/|f| = 0.392$ (GRIN lens 1)
$\phantom{D/|f| =} 0.477$ (GRIN lens 2)

The Abbe's numbers $v_{0d}$ have the values 49.65 and 49.65 for this embodiment.

Embodiment 3

$f = -18.5$, magnification $= 250/|f| = 13.5$ eye point: $-15$ from 1st surface diameter of pupil: 4 image surface: 12.1 from final lens surface

| | | | |
|---|---|---|---|
| $r_1 =$ | 322.0399 | | |
| | $d_1 = 2.2567$ | $n_1 = 1.51633$ | $v_1 = 64.15$ |
| $r_2 =$ | $-17.6038$ | | |
| | $d_2 = 36.6000$ | | |
| $r_3 =$ | 18.7700 | | |
| | $d_3 = 3.0115$ | $n_2 = 1.77250$ | $v_2 = 49.66$ |
| $r_4 =$ | $-66.0501$ | | |
| | $d_4 = 14.7686$ | | |
| $r_5 =$ | 72.7993 | | |
| | $d_5 = 7.8643$ GRIN lens 1 | | |
| $r_6 =$ | 14.3316 | | |
| | $d_6 = 1.3150$ | | |
| $r_7 =$ | $-5.1015$ | | |
| | $d_7 = 10.6871$ GRIN lens 2 | | |
| $r_8 =$ | $-21.6769$ | | |
| | $d_8 = 4.8079$ | | |
| $r_9 =$ | 13.0000 | | |
| | $d_9 = 2.1331$ | $n_5 = 1.60311$ | $v_5 = 60.70$ |
| $r_{10} =$ | $\infty$ | | |

| | GRIN lens 1 | | |
|---|---|---|---|
| | $N_0$ | $N_1$ | $N_2$ |
| d line | 1.77250 | $-0.45375 \times 10^{-2}$ | $0.12940 \times 10^{-4}$ |
| C line | 1.76780 | $-0.44928 \times 10^{-2}$ | $0.95702 \times 10^{-5}$ |
| F line | 1.78336 | $-0.46419 \times 10^{-2}$ | $0.20803 \times 10^{-4}$ |

| | GRIN lens 2 | | |
|---|---|---|---|
| | $N_0$ | $N_1$ | $N_2$ |
| d line | 1.77250 | $-0.49984 \times 10^{-2}$ | $0.12366 \times 10^{-4}$ |
| C line | 1.76780 | $-0.50182 \times 10^{-2}$ | $0.13178 \times 10^{-4}$ |
| F line | 1.78336 | $-0.49522 \times 10^{-2}$ | $0.10471 \times 10^{-4}$ |

$N_{1(R)} \cdot f^2 = -1.553$ (GRIN lens 1)
$\phantom{N_{1(R)} \cdot f^2 =} -1.711$ (GRIN lens 2)
$\phi_{S(R)}/\phi_{M(R)} = -0.603$ (GRIN lens 1)
$\phantom{\phi_{S(R)}/\phi_{M(R)} =} -0.865$ (GRIN lens 2)
$Y_R/Y_F = -1.102$  $|\beta_R| = 0.575$
$D/|f| = 0.425$ (GRIN lens 1)
$\phantom{D/|f| =} 0.578$ (GRIN lens 2)

The Abbe's numbers $\nu_{0d}$ have the values 49.65 and 49.65 for this embodiment.

Embodiment 4 f=−18.5, magnification=250/lfl=13.5 eye point: −15 from 1st surface diameter of pupil: 4 image surface: 7.1 from final lens surface

| | | | |
|---|---|---|---|
| $r_1 =$ | 133.3549 | | |
| | $d_1 = 2.0037$ | $n_1 = 1.51633$ | $\nu_1 = 64.15$ |
| $r_2 =$ | −15.4560 | | |
| | $d_2 = 36.6000$ | | |
| $r_3 =$ | 18.9561 | | |
| | $d_3 = 3.0026$ | $n_2 = 1.77250$ | $\nu_2 = 49.66$ |
| $r_4 =$ | −46.0820 | | |
| | $d_4 = 5.2495$ | | |
| $r_5 =$ | 45.6165 | | |
| | $d_5 = 8.7517$ GRIN lens 1 | | |
| $r_6 =$ | 9.6183 | | |
| | $d_6 = 1.5109$ | | |
| $r_7 =$ | −4.4736 | | |
| | $d_7 = 10.3421$ GRIN lens 2 | | |
| $r_8 =$ | −23.6793 | | |
| | $d_8 = 3.8059$ | | |
| $r_9 =$ | 10.4465 | | |
| | $d_9 = 2.0330$ | $n_5 = 1.65160$ | $\nu_5 = 58.52$ |
| $r_{10} =$ | ∞ | | |

| GRIN lens 1 | | | |
|---|---|---|---|
| | $N_0$ | $N_1$ | $N_2$ |
| d line | 1.77250 | $-0.57152 \times 10^{-2}$ | $-0.12226 \times 10^{-5}$ |
| C line | 1.76780 | $-0.56837 \times 10^{-2}$ | $-0.27266 \times 10^{-5}$ |
| F line | 1.78336 | $-0.57888 \times 10^{-2}$ | $0.22867 \times 10^{-5}$ |

| GRIN lens 2 | | | |
|---|---|---|---|
| | $N_0$ | $N_1$ | $N_2$ |
| d line | 1.77250 | $-0.63865 \times 10^{-2}$ | $0.74928 \times 10^{-4}$ |
| C line | 1.76780 | $-0.64269 \times 10^{-2}$ | $0.75035 \times 10^{-4}$ |
| F line | 1.78336 | $-0.62922 \times 10^{-2}$ | $0.74679 \times 10^{-4}$ |

$N_{1(R)} \cdot f^2 = -1.956$ (GRIN lens 1)
$-2.186$ (GRIN lens 2)
$\phi_{S(R)}/\phi_{M(R)} = -0.620$ (GRIN lens 1)
$-0.922$ (GRIN lens 2)
$Y_R/Y_F = -0.501$  $|\beta_R| = 0.684$
$D/lfl = 0.473$ (GRIN lens 1)
$0.559$ (GRIN lens 2)

The Abbe's numbers $\nu_{0d}$ have the values 49.65 and 49.65 for this embodiment.

Embodiment 5 f=−18.5, magnification=250/lfl=13.5 eye point: −15 from 1st surface diameter of pupil: 4 image surface: 2.5 from final lens surface

| | | | |
|---|---|---|---|
| $r_1 =$ | −25.6657 | | |
| | $d_1 = 2.7627$ | $n_1 = 1.51633$ | $\nu_1 = 64.15$ |
| $r_2 =$ | −11.0855 | | |
| | $d_2 = 36.6000$ | | |
| $r_3 =$ | 16.4631 | | |
| | $d_3 = 3.1438$ | $n_2 = 1.77250$ | $\nu_2 = 49.66$ |
| $r_4 =$ | −70.2836 | | |
| | $d_4 = 17.1692$ | | |
| $r_5 =$ | −36.5103 | | |
| | $d_5 = 30.6173$ GRIN lens | | |
| $r_6 =$ | 10.3821 | | |
| | $d_6 = 0.5000$ | | |
| $r_7 =$ | 13.0799 (aspherical surface) | | |
| | $d_7 = 2.1644$ | $n_4 = 1.60311$ | $\nu_4 = 60.70$ |
| $r_8 =$ | ∞ | | |

| aspherical coefficient |
|---|
| $P = 1$, $A_4 = 0.25713 \times 10^{-4}$ |
| $A_6 = 0.20427 \times 10^{-4}$, $A_8 = 0.60023 \times 10^{-6}$ |

| GRIN lens | | | |
|---|---|---|---|
| | $N_0$ | $N_1$ | $N_2$ |
| d line | 1.77250 | $-0.30612 \times 10^{-2}$ | $0.30148 \times 10^{-4}$ |
| C line | 1.76780 | $-0.30627 \times 10^{-2}$ | $0.30254 \times 10^{-4}$ |
| F line | 1.78336 | $-0.30578 \times 10^{-2}$ | $0.29901 \times 10^{-4}$ |

$N_{1(R)} \cdot f^2 = -1.048$,  $\phi_{S(R)}/\phi_{M(R)} = -1.218$
$|\beta_R| = 0.522$,  $D/lfl = 1.655$ The Abbe's number $\nu_{0d}$ has the value 49.65 for this embodiment.

Embodiment 6 f=−15.0, magnification=250/lfl=16.7 eye point: −15 from 1st surface diameter of pupil: 4 image surface: 2.1 from final lens surface

| | | | |
|---|---|---|---|
| $r_1 =$ | 17.7041 | | |
| | $d_1 = 2.5539$ | $n_1 = 1.51633$ | $\nu_1 = 64.15$ |
| $r_2 =$ | −85.8615 | | |
| | $d_2 = 36.6000$ | | |
| $r_3 =$ | 26.7421 | | |
| | $d_3 = 2.9524$ GRIN lens | | |
| $r_4 =$ | −56.6400 | | |
| | $d_4 = 20.9987$ | | |
| $r_5 =$ | 10.8330 | | |
| | $d_5 = 2.3928$ | $n_3 = 1.61700$ | $\nu_3 = 62.79$ |
| $r_6 =$ | 142.8830 | | |
| | $d_6 = 4.6684$ | | |
| $r_7 =$ | −5.3707 | | |
| | $d_7 = 3.8380$ | $n_4 = 1.84666$ | $\nu_4 = 23.78$ |
| $r_8 =$ | −14.1220 | | |
| | $d_8 = 1.1628$ | | |
| $r_9 =$ | −21.6341 | | |
| | $d_9 = 2.3063$ | $n_5 = 1.69680$ | $\nu_5 = 55.52$ |
| $r_{10} =$ | −6.9099 | | |
| | $d_{10} = 0.8034$ | | |
| $r_{11} =$ | 33.0982 | | |
| | $d_{11} = 4.4950$ | $n_6 = 1.61700$ | $\nu_6 = 62.79$ |
| $r_{12} =$ | −10.6356 | | |
| | $d_{12} = 18.9903$ | | |
| $r_{13} =$ | 12.0422 | | |
| | $d_{13} = 1.8018$ | $n_7 = 1.49216$ | $\nu_7 = 57.50$ |
| $r_{14} =$ | ∞ | | |

| GRIN lens | | | |
|---|---|---|---|
| | $N_0$ | $N_1$ | $N_2$ |
| d line | 1.77250 | $0.28720 \times 10^{-3}$ | $-0.39076 \times 10^{-5}$ |
| C line | 1.76780 | $0.28892 \times 10^{-3}$ | $-0.39310 \times 10^{-5}$ |
| F line | 1.78336 | $0.28318 \times 10^{-3}$ | $-0.38529 \times 10^{-5}$ |

$|\beta_R| = 0.530$

The Abbe's number $\nu_{0d}$ has the value 49.65 for this embodiment.

Embodiment 7 f=−15.0, magnification=250/lfl=16.7 eye point: −15 from 1st surface diameter of pupil: 4
image surface: 4.9 from final lens surface

| | | | |
|---|---|---|---|
| $r_1 =$ | 31.7226 | | |
| | $d_1 = 2.5656$ GRIN lens | | |
| $r_2 =$ | −20.9652 | | |
| | $d_2 = 36.6000$ | | |
| $r_3 =$ | 27.3989 | | |
| | $d_3 = 2.9053$ | $n_2 = 1.77250$ | $v_2 = 49.66$ |
| $r_4 =$ | −50.5415 | | |
| | $d_4 = 20.8212$ | | |
| $r_5 =$ | 11.6501 | | |
| | $d_5 = 2.5370$ | $n_3 = 1.61700$ | $v_3 = 62.79$ |
| $r_6 =$ | 58.3263 | | |
| | $d_6 = 4.7460$ | | |
| $r_7 =$ | −5.7579 | | |
| | $d_7 = 3.8384$ | $n_4 = 1.84666$ | $v_4 = 23.78$ |
| $r_8 =$ | 14.3246 | | |
| | $d_8 = 1.1636$ | | |
| $r_9 =$ | −15.4455 | | |
| | $d_9 = 2.3102$ | $n_5 = 1.69680$ | $v_5 = 55.52$ |
| $r_{10} =$ | −7.0788 | | |
| | $d_{10} = 0.8034$ | | |
| $r_{11} =$ | 31.9416 | | |
| | $d_{11} = 4.4925$ | $n_6 = 1.61700$ | $v_6 = 62.79$ |
| $r_{12} =$ | −10.5591 | | |
| | $d_{12} = 19.5425$ | | |
| $r_{13} =$ | 21.7249 | | |
| | $d_{13} = 1.8018$ | $n_7 = 1.49216$ | $v_7 = 57.50$ |
| $r_{14} =$ | ∞ | | |

| | GRIN lens | | |
|---|---|---|---|
| | $N_0$ | $N_1$ | $N_2$ |
| d line | 1.51633 | $-0.45125 \times 10^{-4}$ | $-0.93142 \times 10^{-5}$ |
| C line | 1.51385 | $-0.60987 \times 10^{-4}$ | $-0.87728 \times 10^{-5}$ |
| F line | 1.52190 | $-0.81139 \times 10^{-5}$ | $-0.10577 \times 10^{-4}$ |
| | $|\beta_R| = 0.612$ | | |

The Abbe's number $v_{0d}$ has the value 64.14 for this embodiment.

wherein the reference symbols $r_1, r_2, \ldots$ represent the radii of curvature on the respective lens elements, the reference symbols $d_1, d_2, \ldots$ designate the thicknesses of the respective lens elements and the airspaces reserved therebetween, the reference symbols $n_1, n_2, \ldots$ denote the refractive indices of the respective lens elements, and the reference symbols $v_1, v_2, \ldots$ represent Abbe's numbers of the respective lens elements.

The Embodiments 1 through 5 are designed mainly so as to compose the viewfinder optical system of a reduced number of lens elements. In contrast, the Embodiments 6 and 7 are designed mainly so as to enhance magnification of the viewfinder optical system.

Figure 3:
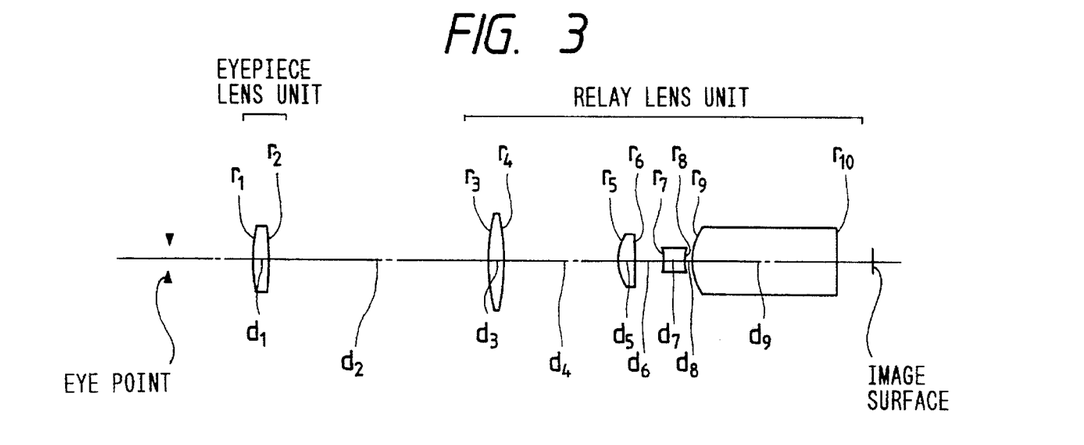
FIG. 3 through FIG. 9 show sectional views illustrating compositions of Embodiments 1 through 7 of the viewfinder optical system according to the present invention.

The Embodiment 1 has the composition shown in FIG. 3 wherein the viewfinder optical system is composed, in the order from the eye side, of an eyepiece lens unit consisting only of a first positive lens element, and a relay lens unit consisting of a second positive lens element, a third positive lens element, a fourth negative lens element and a fifth positive lens element. Out of these lens elements, the fifth positive lens element arranged in the relay lens unit is designed as the radial GRIN lens element satisfying the condition (1).

Since the relay lens unit comprises the negative lens element in the Embodiment 1, it is unnecessary to impart a negative refractive power to the radial GRIN lens element for correcting Petzval's sum and chromatic aberration. A weekly positive refractive power is imparted to the surface of the radial GRIN lens element for correcting the offaxial aberrations, and Petzval's sum is corrected by sharing most of the positive refractive power of the radial GRIN lens element to the medium thereof. In order to correct the Petzval's sum especially by the medium of the radial GRIN lens element in the Embodiment 1, the radial GRIN lens element is designed so as to satisfy the following condition (5):

$$0.1 < D/|f| < 3.0 \tag{5}$$

wherein the reference symbol D represents the thickness of the radial GRIN lens arranged in the relay lens unit.

If the lower limit of the condition (5) is exceeded, the difference between the refractive powers of the radial GRIN lens element must be large for obtaining the positive refractive power required for the relay lens unit, thereby making it difficult to manufacture the radial GRIN lens element in practice, and the refractive power of medium will have a large influence, thereby aggravating spherical aberration. If the upper limit of the condition (5) is exceeded, in contrast, the radial GRIN lens element will have a positive refractive power strong enough to aggravate spherical aberration and the viewfinder optical system will undesirably be enlarged.

Figure 10:
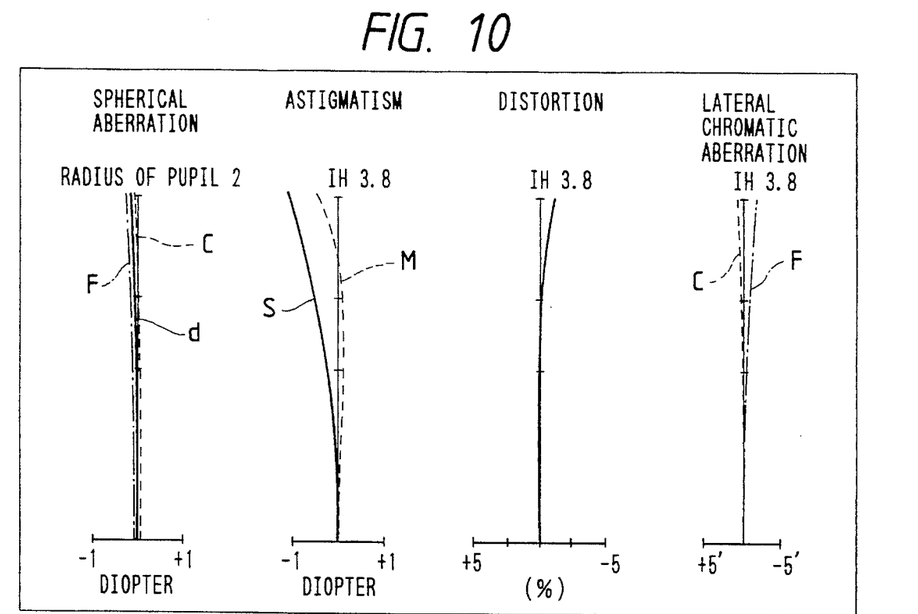
FIG. 10 through FIG. 16 show curves illustrating aberration characteristics of the Embodiments 1 through 7 of the present invention.

By selecting the composition described above, it is possible to obtain a viewfinder optical system in which the relay lens unit and the eyepiece lens unit are composed of the five lens elements in total, and aberrations are corrected sufficiently favorably. Aberration characteristics of the Embodiment 1 are illustrated in FIG. 10.

Figure 4:
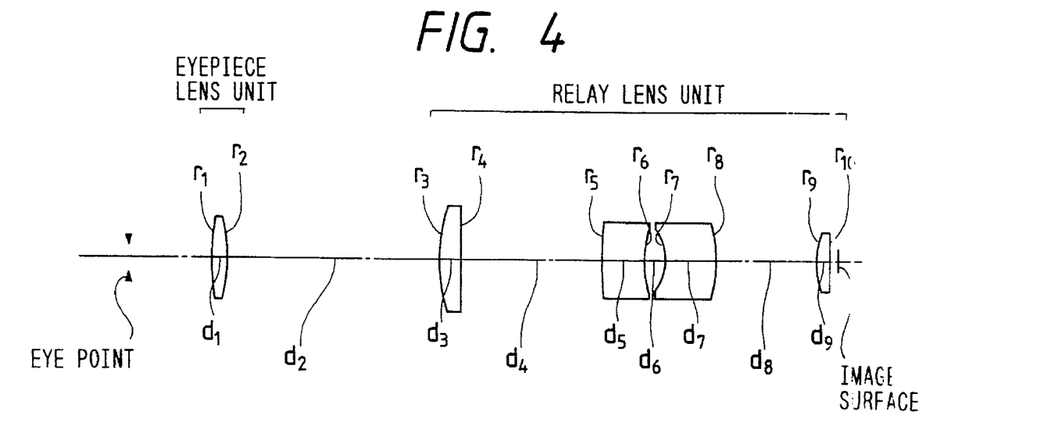
Figure 5:
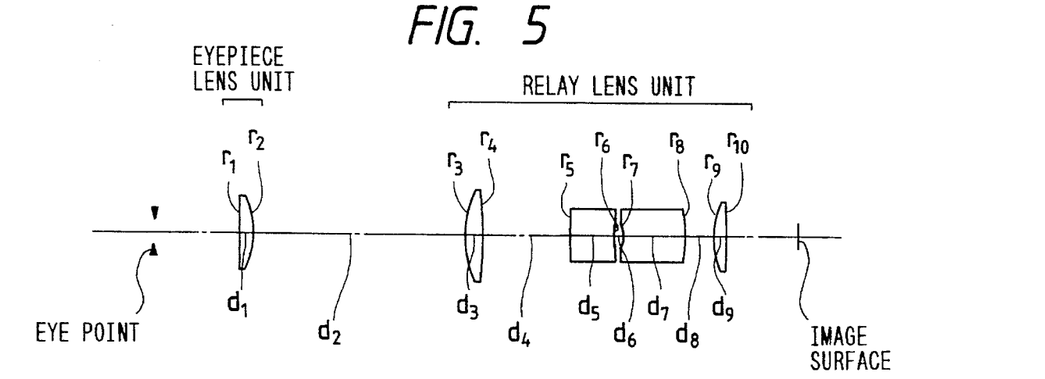
Figure 6:
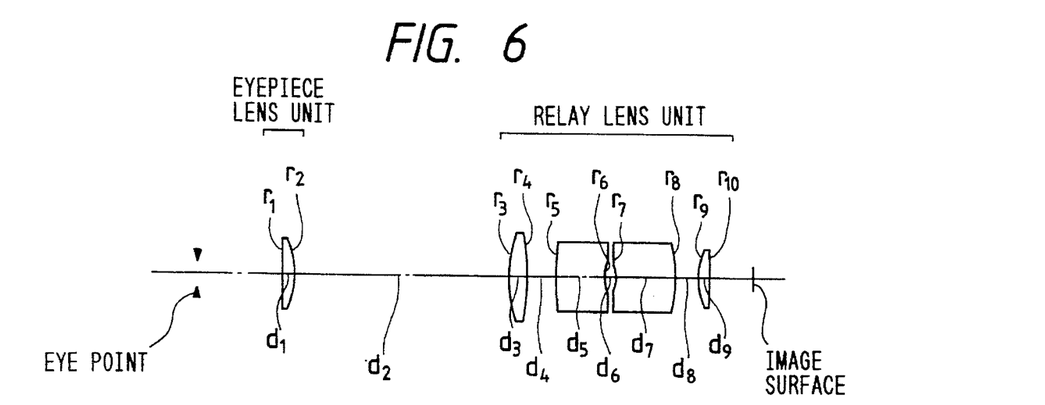

The Embodiments 2 through 4 have the compositions illustrated in FIG. 4 through FIG. 6 respectively. Each of these embodiments comprises, in the order from the eye side, an eyepiece lens unit composed only of a first positive lens element, and a relay lens unit composed of a second positive lens element, a third positive lens element, a fourth positive lens element and a fifth positive lens element. The third positive lens element and the fourth positive lens element arranged in the relay lens unit are designed as radial GRIN lens elements satisfying the conditions (1), (2) and (5).

Each of these radial GRIN lens element has a negative refractive power of surface, a positive refractive power of medium and a positive total refractive power. These radial GRIN lens elements have small radii of curvature on the concave surfaces thereof and arranged so as to oppose these concave surfaces to each other for correcting Petzval's sum and chromatic aberration without using a lens element having a negative refractive power, and for composing the viewfinder optical system of a reduced number of lens elements.

The Embodiments 3 and 4 are designed so as to further satisfy the condition (3) for reducing the number of lens elements and shortening total length of the viewfinder optical system. Out of these embodiments, the Embodiment 3 has a distance of 110 mm as measured from the eye point to the image surface thereof, and the Embodiment 4 has a distance of 94 mm as measured from the eye point to the image surface thereof for shortening the total length of the viewfinder optical system having favorably corrected aberrations.

Figure 11:
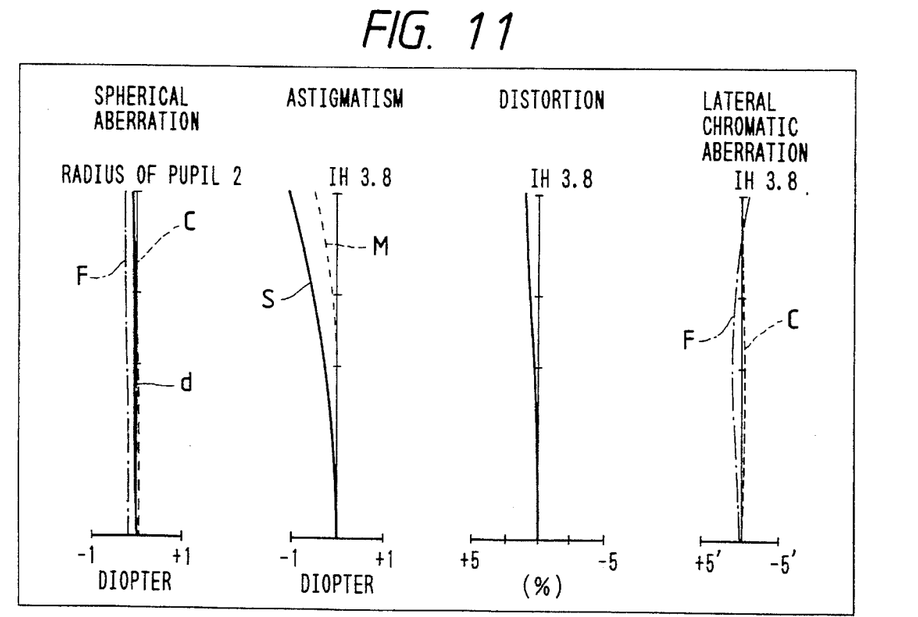
Figure 12:
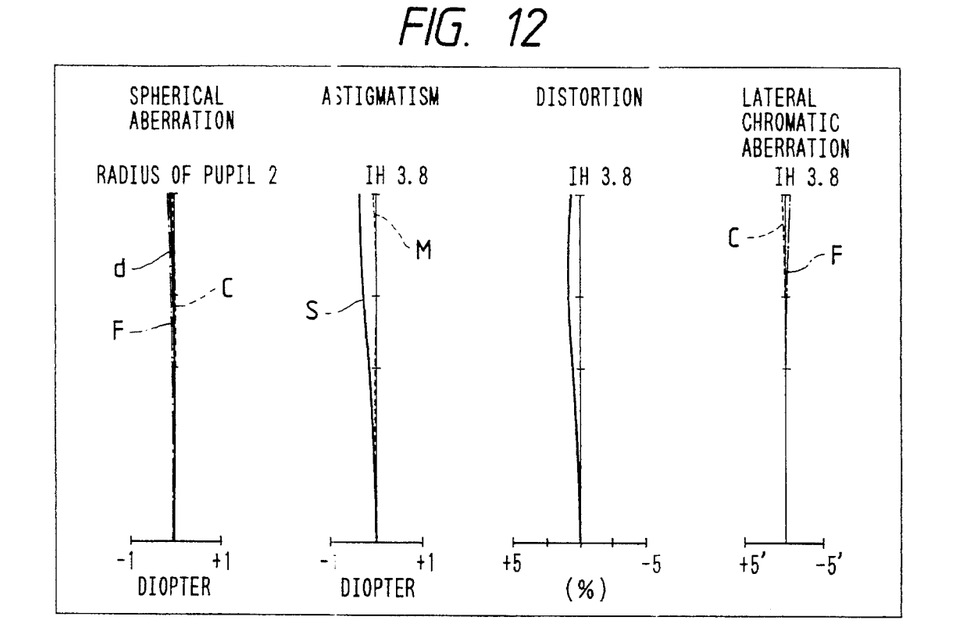
Figure 13:
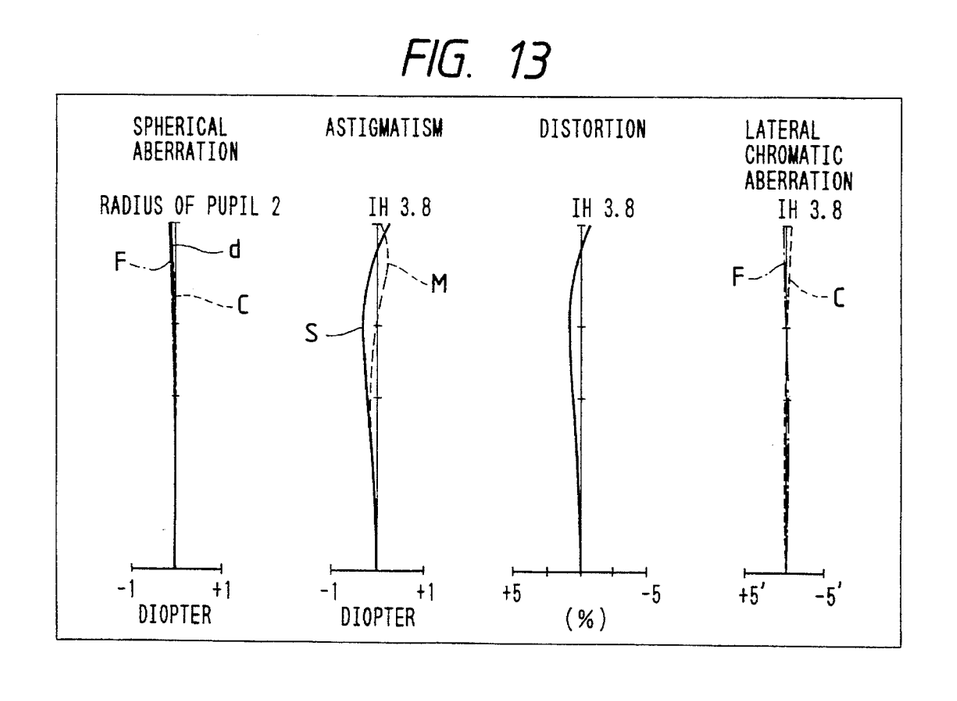

Aberration characteristics of the Embodiments 2 through 4 are visualized in FIG. 11 through FIG. 13 respectively.

Figure 7:
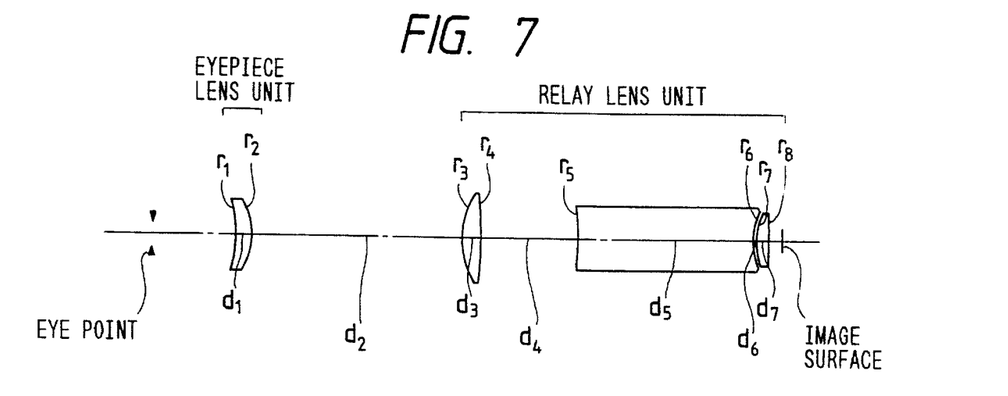

The Embodiment 5 has the composition illustrated in FIG. 7 wherein the viewfinder optical system comprises, in the order from the eye side, an eyepiece lens unit composed only of a first positive lens element, and a relay lens unit composed of a second positive lens element, a third positive lens element and a fourth positive lens element. The third lens element arranged in the relay lens unit is designed as a radial GRIN lens element satisfying the conditions (1), (2) and (5).

This radial GRIN lens element also has a negative refractive power of surface, a positive refractive power of medium and a positive total power. This radial GRIN lens serves for correcting Petzval's sum and chromatic aberration without using a negative lens element.

In the Embodiment 5, the eye side surface of the fourth lens unit arranged in the relay lens unit is designed as an aspherical surface having positive refractive power strengthened as the surface portions are farther from the optical axis. The offaxial aberrations, especially distortion, are corrected favorably by this aspherical surface.

When the intersection between the aspherical surface and the optical axis is taken as the origin, the optical axis is taken as the x axis and the direction perpendicular to the optical axis is taken as the y axis, the shape of the aspherical surface is expressed by the following formula:

$$x = \frac{y^2/r}{1+\sqrt{1-p(y/r)^2}} + \sum_{i=2}^{n} A_{2i} y^{2i}$$

wherein the reference symbol r represents the radius of curvature on the reference sphere of the aspherical surface, the reference symbol p designates the conical constant and the reference symbol $A_{2_i}$ denotes the aspherical surface coefficient.

Figure 14:
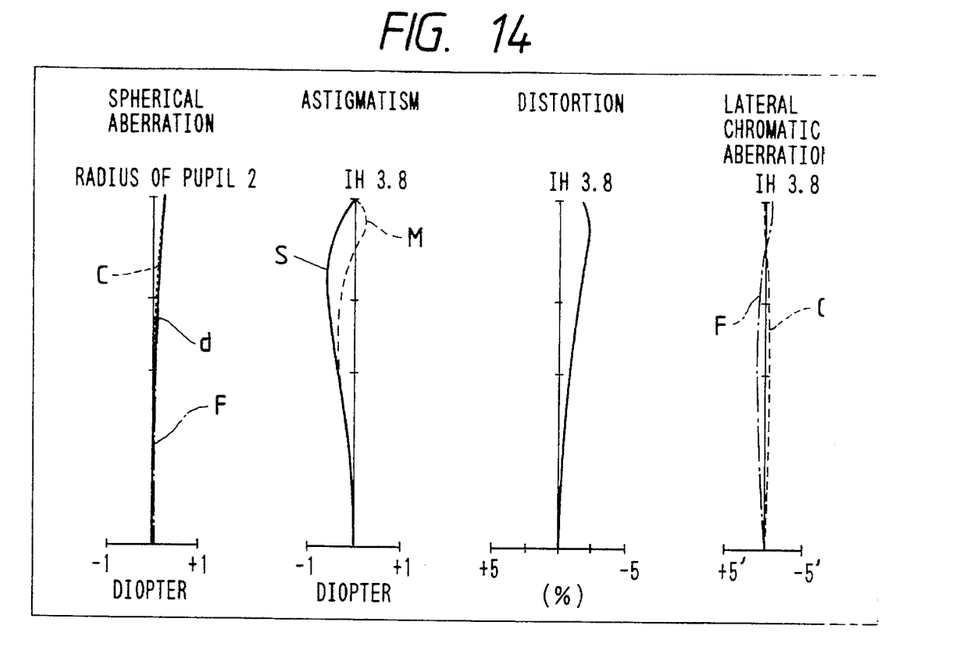

The Embodiment 5 selects the composition described above, thereby correcting aberrations favorably with the four lens elements. Aberration characteristics of the Embodiment 5 are illustrated in FIG. 14.

Figure 8:
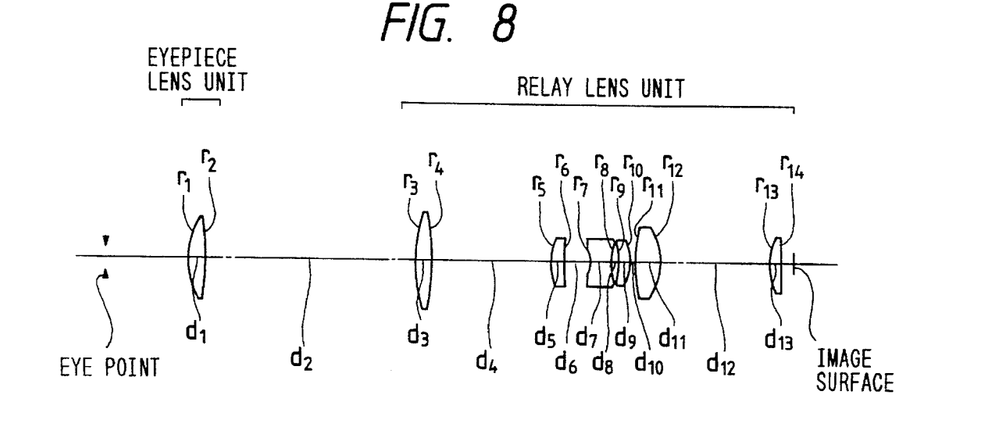
Figure 9:
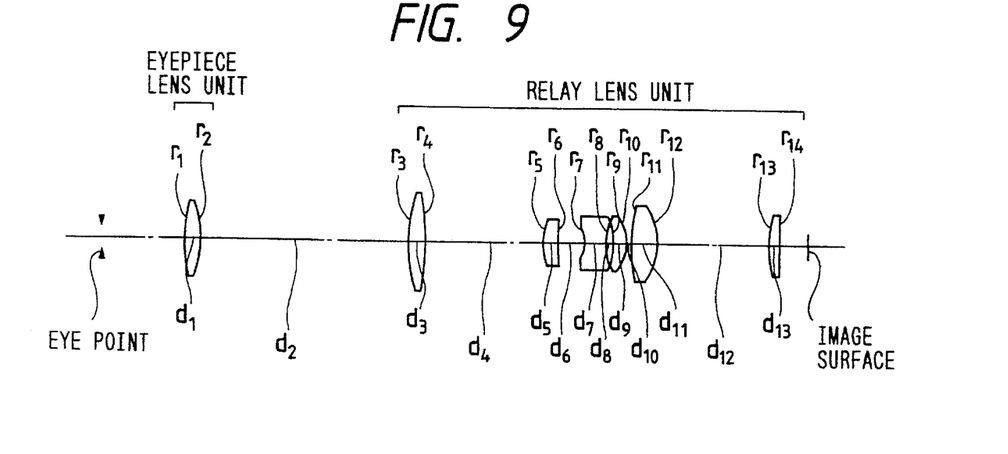

The Embodiments 6 and 7 have the compositions illustrated in FIG. 8 and FIG. 9 respectively, in each of which the viewfinder optical system comprises, in the order from the eye side, an eyepiece lens unit composed of a first positive lens element, and a relay lens unit composed of a second positive lens element, a third positive lens element, a fourth negative lens element, a fifth positive lens element, a sixth positive lens element and a seventh positive lens element.

In the Embodiment 6, the second lens element arranged in the relay lens unit is designed as a radial GRIN lens element. In the Embodiment 7, the first lens element arranged in the eyepiece lens unit is designed as a radial GRIN lens element.

These Embodiments 6 and 7 have short focal lengths for enhancing magnifications thereof. In these cases, the offaxial rays are incident at large angles on the lens elements arranged in the eyepiece lens units and the lens elements arranged in the relay lens units at locations near the eyepiece lens units. In the Embodiments 6 and 7, aberrations are corrected by the radial GRIN lens elements out of the lens element on which the offaxial rays are incident at large angles, thereby composing the viewfinder optical systems having favorably corrected aberrations regardless of high magnifications of approximately ×17.

Figure 15:
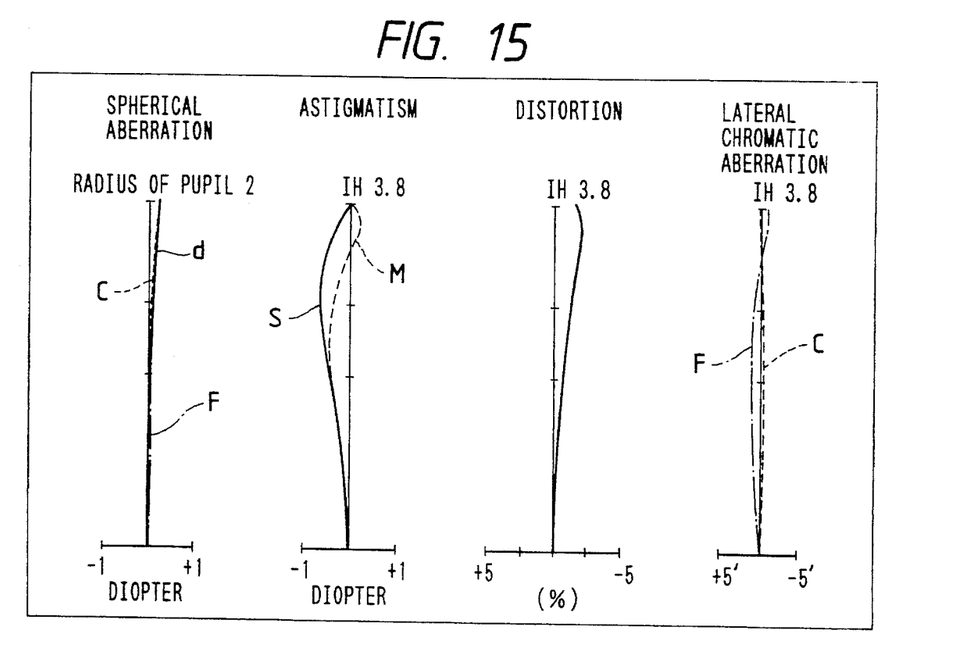
Figure 16:
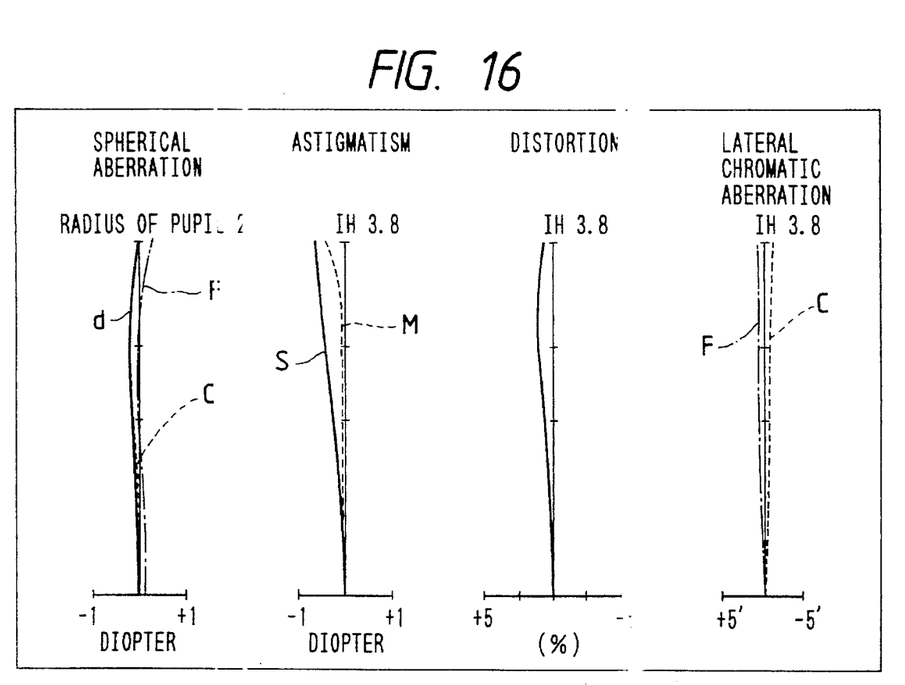

Aberration characteristics of the Embodiments 6 and 7 are visualized in FIG. 15 and FIG. 16 respectively.

Though only the eyepiece lens unit and the relay lans unit are comprised in each of the embodiments described above, an objective lens unit having a positive refractive power is actually arranged after (on the right side in the drawings) the image surface. That is to say, an image is formed on the image surface by an objective lens unit which is not shown.

Further, each of the Embodiments 1 through 7 has a focal length f which is equal to the total focal length of the eyepiece lens unit and the relay lens unit. This total focal length f has a negative value since the imaging magnification of the relay lens unit is negative.

The aberration characteristics of the Embodiments 1 through 7 illustrated in FIG. 10 through FIG. 16 are traced at −1 diopter on an assumption that light is incident from the side of the eyepiece lens unit and focused on the image surface.

The viewfinder optical system is suited for use with electronic still cameras and video cameras, comprises a small number of lens elements, and has a magnification as high as approximately 17 and favorably corrected aberrations.

I claim:

1. An optical system comprising in order from an object side:

an objective lens unit having a positive refractive power;

a relay lens unit having a positive refractive power; and an eyepiece lens unit having a positive refractive power;

wherein said optical system operates so as to form, by said objective lens unit, an inverted image of an object to be observed and said inverted image is inverted once again by said relay lens unit for observation through said eyepiece lens unit;

said relay lens unit including a graded refractive lens element with a refractive index expressed by the formula below and satisfying the following condition (1):

$$N(h) = N_0 + N_1 h^2 + N_2 h^4 + \ldots \quad -5.0 < N_{1(R)} \cdot f^2 < 0 \qquad (1)$$

wherein the reference symbol $N_0$ represents the refractive index of said graded refractive index lens element as measured on an optical axis, the reference symbol h designates the distance as measured from the optical axis to a lens portion of interest in the radial direction, the reference symbol N(h) denotes the refractive index of a lens portion located at the radial distance of h from the optical axis, the reference symbols $N_1$, $N_2$, ... represent the refractive index distribution coefficients of the second order, fourth order, ..., the reference symbol $N_{1(R)}$ designates the refractive index distribution coefficient of the second order, for the d-line, of the graded refractive index lens element used in the relay lens unit, and the reference symbol f denotes a total focal length of the relay lens unit and the eyepiece lens unit.

2. An optical system according to claim 1 wherein said graded refractive index lens element has a positive refractive power of medium, a negative refractive power of surface and a positive total refractive power.

3. An optical system according to claim 2 wherein said relay lens unit comprises only positive lens elements and said graded refractive index lens element satisfies the following condition (2):

$$\phi_{S(R)}/\phi_{M(R)} < 0 \qquad (2)$$

wherein the reference symbol $\phi_{S(R)}$ represents the refractive power of surface of said graded refractive index lens element and the reference symbol $\phi_{M(R)}$ designates the refractive power of medium of said graded refractive index lens element.

4. An optical system according to claim 2 wherein said relay unit comprises two graded refractive index lens elements each having a positive refractive power and a concave surface, wherein said concave surfaces are disposed so as to be opposite each other.

5. An optical system according to claim 4 satisfying the following condition (3):

$$-3.0 < Y_R/Y_F < 0.2 \qquad (3)$$

wherein the reference symbol $Y_R$ represents the height of the principal ray having the maximum field angle on an image side surface of the graded refractive index lens element disposed on the image side of said two graded refractive index lens elements, and the reference symbol $Y_F$ designates the height of the principal ray having the maximum field angle on an object side surface of the graded refractive index lens disposed on the object side out of said two graded refractive index lens elements.

6. An optical system according to claim 1 wherein the lens element arranged in the relay lens unit at the location nearest the eyepiece lens unit is designed as the graded refractive index lens element.

7. An optical system according to claim 1 wherein said graded refractive index lens element satisfies the following condition (5):

$$0.1 < D/|f| < 3.0 \tag{5}$$

wherein the reference symbol D represents the thickness of the graded refractive index lens element.

8. An optical system according to claim 7 wherein the relay lens unit comprises a lens element having an aspherical surface having a positive refractive power strengthened as portions of said lens element are farther from the optical axis.

9. An optical system according to claim 1 wherein said graded refractive index lens element has a positive refractive power of medium and a positive refractive power of surface.

10. An optical system for viewfinders comprising, in order from an object side:

an objective lens unit having a positive refractive power, a relay lens unit having a positive refractive power, and an eyepiece lens unit having a positive refractive power, wherein said optical system operates so as to form an inverted image of an object to be observed by the objective lens unit, and said inverted image is inverted once again by the relay lens unit for observation through the eyepiece lens unit, wherein said eyepiece lens unit includes a graded refractive index lens element, said graded refractive lens element having a refractive index expressed by the formula below and satisfying condition (1):

$$N(h) = N_0 + N_1 h^2 + N_2 h^4 + \ldots -5.0 < N_{1(R)} \cdot f^2 < 0 \tag{1}$$

wherein the reference symbol $N_0$ represents the refractive index of said graded refractive index lens element as measured on an optical axis, the reference symbol h designates the distance as measured from the optical axis to a lens portion of interest in the radial direction, the reference symbol N(h) denotes the refractive index of a lens portion located at the radial distance of h from the optical axis, the reference symbols $N_1$, $N_2$, ... represent the refractive index distribution coefficients of the second order, fourth order, ..., the reference symbol $N_{1(R)}$ designates the refractive index distribution coefficient of the second order, for the d-line, of the graded refractive index lens element used in the eyepiece lens unit, and the reference symbol f denotes the total focal length of the relay lens unit and the eyepiece lens unit.

11. An optical system according to claim 6, 8 or 10 wherein said relay lens unit satisfies the following condition (4):

$$0.4 < |\beta_R| < 0.8 \tag{4}$$

wherein the reference symbol $\beta_R$ represents an imaging magnification of the relay lens unit.

12. An optical system for viewfinders comprising:

an objective lens unit for forming an image of an object to be observed;

a relay lens unit for only once reforming a real image by inverting the image formed by said objective lens unit; and an eyepiece lens unit for allowing observation therethrough of the image of the object reformed by said relay lens unit;

wherein said eyepiece lens unit includes a graded refractive index lens element having a refractive index distribution expressed by the formula shown below and satisfying the following condition (1):

$$N(h) = N_0 + N_1 h^2 + N_2 h^4 + \ldots -5.0 < N_{1(R)} \cdot f^2 < 0 \tag{1}$$

wherein the reference symbol $N_0$ represents the refractive index of said graded refractive index lens element as measured on an optical axis, the reference symbol h designates the distance as measured from the optical axis to a lens portion of interest in the radial direction, the reference symbol N(h) denotes the refractive index of a lens portion located at the radial distance of h from the optical axis, the reference symbols $N_1$, $N_2$, ... represent the refractive index distribution coefficients of the second order, fourth order, ..., the reference symbol $N_{1(R)}$ designates the refractive index distribution coefficient of the second order, for the d-line, of the graded refractive index lens element used in the eyepiece lens unit, and the reference symbol f denotes the total focal length of the relay lens unit and the eyepiece lens unit.

* * * * *